United States Patent [19]
Naquin, Jr.

[11] Patent Number: 5,917,141
[45] Date of Patent: Jun. 29, 1999

[54] AIR FILTER MONITORING DEVICE

[76] Inventor: Clyde J. Naquin, Jr., 107 Garden Cir., Thibodaux, La. 70301

[21] Appl. No.: 09/005,668

[22] Filed: Jan. 12, 1998

[51] Int. Cl.$^6$ .................................................. B01D 46/42
[52] U.S. Cl. ........................... 96/417; 96/418; 96/419; 116/DIG. 25
[58] Field of Search .................... 95/25, 23; 96/417, 96/418, 419, 422, FOR 170; 116/DIG. 25

[56] References Cited

U.S. PATENT DOCUMENTS

| | | |
|---|---|---|
| 1,914,667 | 6/1933 | Kolla . |
| 2,034,373 | 3/1936 | Bilde ........................................ 116/114 |
| 2,057,904 | 10/1936 | Morse ........................................ 96/418 |
| 2,746,416 | 5/1956 | Aufderheide ............................ 116/117 |
| 3,027,865 | 4/1962 | Kautz et al. ............................ 116/114 |
| 3,397,395 | 8/1968 | Pierce ....................................... 96/422 |
| 3,611,337 | 10/1971 | Balzer ...................................... 96/417 |
| 4,040,042 | 8/1977 | Mayer ...................................... 96/419 |
| 4,121,199 | 10/1978 | Young ...................................... 96/419 |
| 4,610,703 | 9/1986 | Kowalczyk ............................... 96/417 |
| 4,702,753 | 10/1987 | Kowalczyk ............................... 96/418 |
| 4,747,364 | 5/1988 | Horowitz ................................. 96/419 |
| 5,057,821 | 10/1991 | Card ........................................ 96/419 |
| 5,429,649 | 7/1995 | Robin ...................................... 96/417 |

*Primary Examiner*—Duane S. Smith
*Attorney, Agent, or Firm*—Joseph N. Breaux

[57] ABSTRACT

An air filter monitoring device that includes an attachment mechanism for attaching the monitoring device to the cover grate of an air return of an air conditioning system and a first and a second air flow actuated switch wired electrically in series with an alerting device, such as a light emitting diode and/or an audible alarm, each having an air resistance plate positioned within an air flow chamber. The air flow chamber is formed within a housing having an adjustable air intake inlet in connection with the air flow chamber. Air flowing through the air flow chamber within a range between a first and a second predetermined value causes the first and second air flow actuated switches to activate the alerting device.

15 Claims, 3 Drawing Sheets

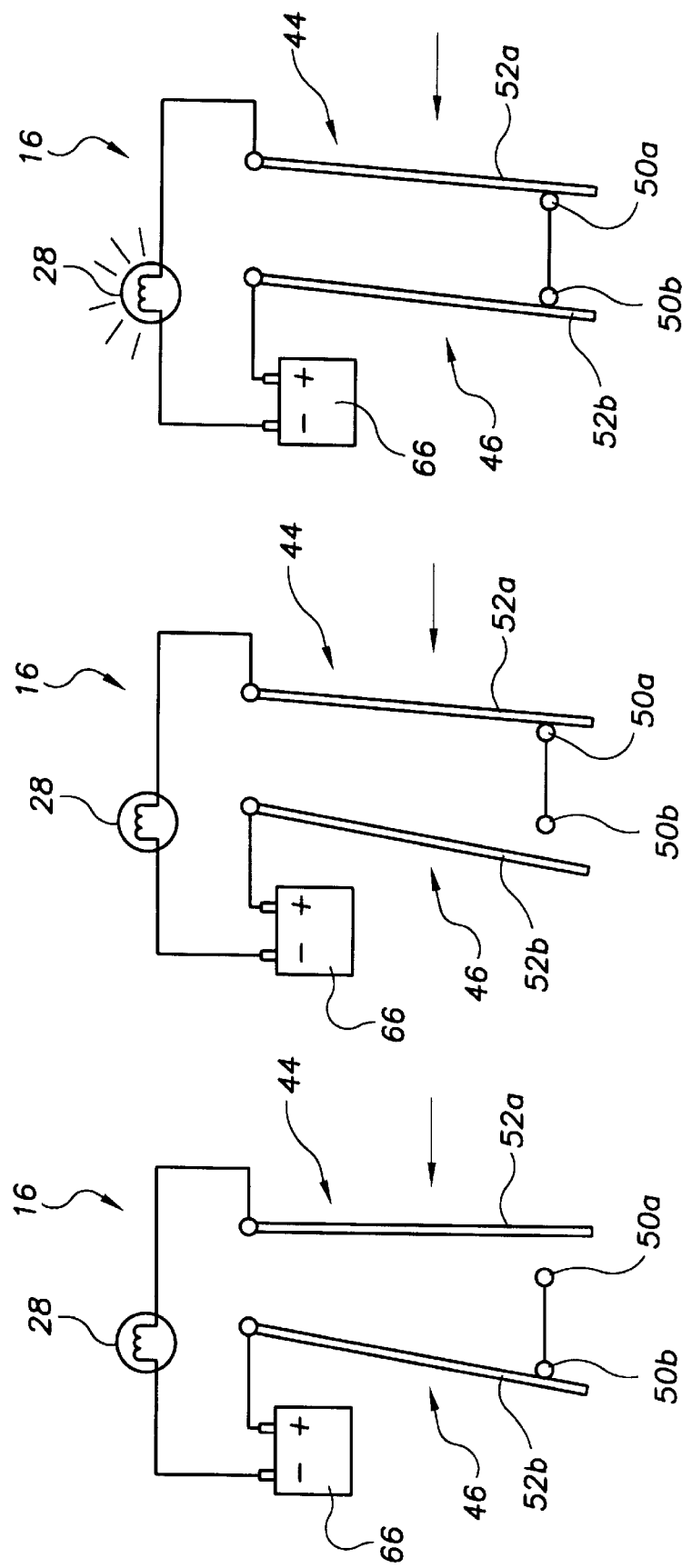

ized in a manner such that when no air is flowing through the air flow chamber the first and second air actuated switches provide an open circuit between the alerting device and a battery; when air is flowing through the air flow chamber at a value greater than the first predetermined value and less than the second predetermined value, the first and second air actuated switches provide a closed circuit between the alerting device and a battery and the alerting device are active; and when air is flowing through the air flow chamber at a value greater than the first predetermined value and greater than the second predetermined value, the first and second air actuated switches provide an open circuit between the alerting device and a battery.

AIR FILTER MONITORING DEVICE

TECHNICAL FIELD

The present invention relates to air filters and more particularly to an air filter monitoring device attachable to the cover grate of an air return of an air conditioning system that has a first and a second air flow actuated switch wired electrically in series with an alerting device, such as a light emitting diode and/or an audible alarm, each having an air resistance plate positioned within an air flow chamber. The air flow chamber is formed within a housing having an adjustable air intake inlet in connection with the air flow chamber. The first air flow actuated switch is normally open and is closed by an airflow through the air flow chamber greater than a first predetermined value. The second air flow actuated switch is normally closed and is opened by an air flow through the air flow chamber greater than a second predetermined value. The first and second predetermined values are selected in a manner such that when no air is flowing through the air flow chamber the first and second air actuated switches provide an open circuit between the alerting device and a battery; when air is flowing through the air flow chamber at a value greater than the first predetermined value and less than the second predetermined value, the first and second air actuated switches provide a closed circuit between the alerting device and a battery and the alerting device are active; and when air is flowing through the air flow chamber at a value greater than the first predetermined value and greater than the second predetermined value, the first and second air actuated switches provide an open circuit between the alerting device and a battery.

BACKGROUND OF INVENTION

The air return of most air conditioning systems is provided with an air filter to remove airborne dust and other airborne contaminants that could clog and/or cover the coils of the evaporator or heating element of the air conditioning system. These air filters become clogged with filtered contaminants and must be periodically cleaned or replaced in order to avoid a decrease in air conditioning efficiency. It would be a benefit, therefore, to have a monitoring device that could be attached to the air return intake of an air conditioning system that could detect and alert the person charged with replacing or cleaning the air filter when such maintenance was required.

SUMMARY OF INVENTION

It is thus an object of the invention to provide an air filter monitoring device that is attachable to the air return intake of an air conditioning system that can detect a clogged filter condition and provide an alerting output.

It is a further object of the invention to provide an air filter monitoring device that includes a pair air flow actuated switches that are wired in series with an alerting device.

It is a still further object of the invention to provide an air filter monitoring device that includes a pair of air flow actuated switches wherein each of the air flow actuated switches is actuated at a different air flow value.

It is a still further object of the invention to provide an air filter monitoring device that includes a user adjustable air intake opening to allow the user to tune the monitoring device to a particular air conditioning system.

It is a still further object of the invention to provide an air filter monitoring device that includes a pair of air flow actuated switches wherein at least one of the air flow actuated switches includes an adjustment mechanism for adjusting the air flow value at which it is actuated.

It is a still further object of the invention to provide an air filter monitoring device that accomplishes all or some of the above objects in combination.

Accordingly, an air filter monitoring device is provided. The air filter monitoring device includes an attachment mechanism for attaching the monitoring device to the cover grate of an air return of an air conditioning system. The monitoring system includes a first and a second air flow actuated switch wired electrically in series with an alerting device, such as a light emitting diode and/or an audible alarm, each having an air resistance plate positioned within an air flow chamber. The air flow chamber is formed within a housing having an adjustable air intake inlet in connection with the air flow chamber. The first air flow actuated switch is normally open and is closed by an airflow through the air flow chamber greater than a first predetermined value. The second air flow actuated switch is normally closed and is opened by an air flow through the air flow chamber greater than a second predetermined value. The first and second predetermined values are selected in a manner such that when no air is flowing through the air flow chamber the first and second air actuated switches provide an open circuit between the alerting device and a battery; when air is flowing through the air flow chamber at a value greater than the first predetermined value and less than the second predetermined value, the first and second air actuated switches provide a closed circuit between the alerting device and a battery and the alerting device are active; and when air is flowing through the air flow chamber at a value greater than the first predetermined value and greater than the second predetermined value, the first and second air actuated switches provide an open circuit between the alerting device and a battery.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 5 is a schematic diagram of the electrical components of the monitoring device showing the first and second air resistance plates in the zero air flow position.

FIG. 6 is a schematic diagram of the electrical components of the monitoring device showing the first and second air resistance plates when the air flow value is greater than the first and second predetermined values.

FIG. 7 is a schematic diagram of the electrical components of the monitoring device showing first and second air resistance plates when the air flow value is greater than the first predetermined value and less than the second predetermined value.

EXEMPLARY EMBODIMENTS

Figure 1:
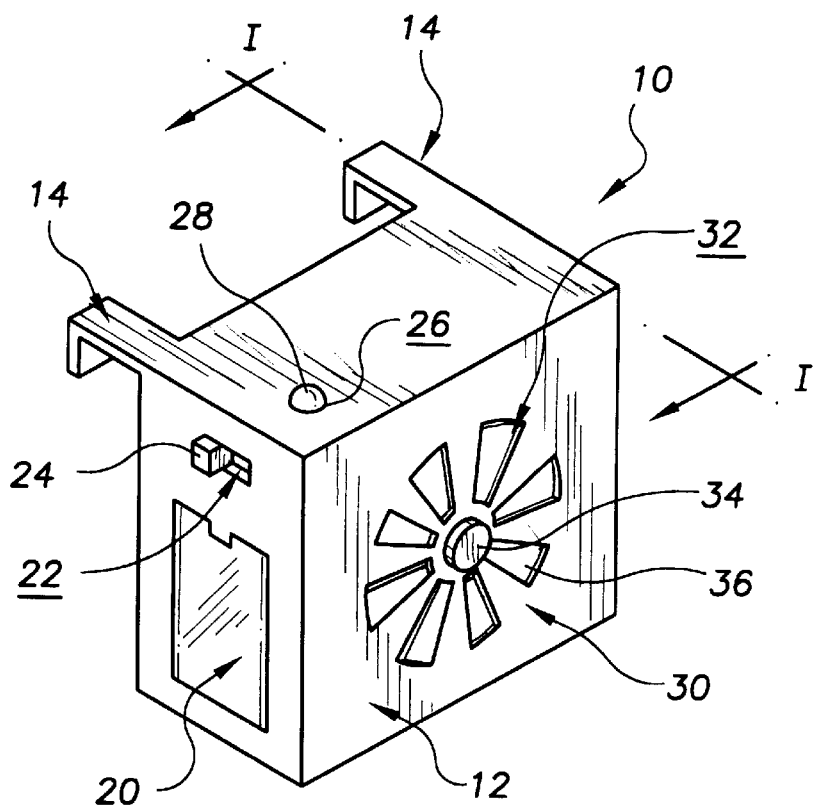
FIG. 1 is a front perspective view of an exemplary embodiment of the air filter monitoring device of the present invention showing the housing, the battery compartment, the on/off switch, the air intake grate attachment hooks, the visual alerting light emitting diode, and the adjustable air intake inlet into the air flow chamber.

FIG. 1 shows an exemplary embodiment of the air filter monitoring device of the present invention generally designated by the numeral 10. Monitoring device 10 includes a housing, generally designated 12; a pair of attachment hooks, generally designated 14; and a monitoring circuit, generally designated 16 (FIGS. 5–7).

Housing 12 is molded from plastic and includes the two integrally formed L-shaped attachment hooks 14; a battery storage compartment 20 for a holding a battery for powering monitoring circuit 16; an on/off switch aperture 22 through which an on/off switch 24 is positioned; an alerting light emitting diode aperture 26 through which the end of an alerting light emitting diode 28 is positioned; and an adjustable air intake inlet, generally designated by the numeral 30. In this embodiment, adjustable air intake inlet 30 includes a number of radially positioned air intake apertures 32 and a rotary blocking wheel, generally designated 34 having a number of blocking vanes 36 that are rotatable to adjust the effective area of each of air intake apertures 32 leading into air flow chamber 40 (FIG. 2).

Figure 2:
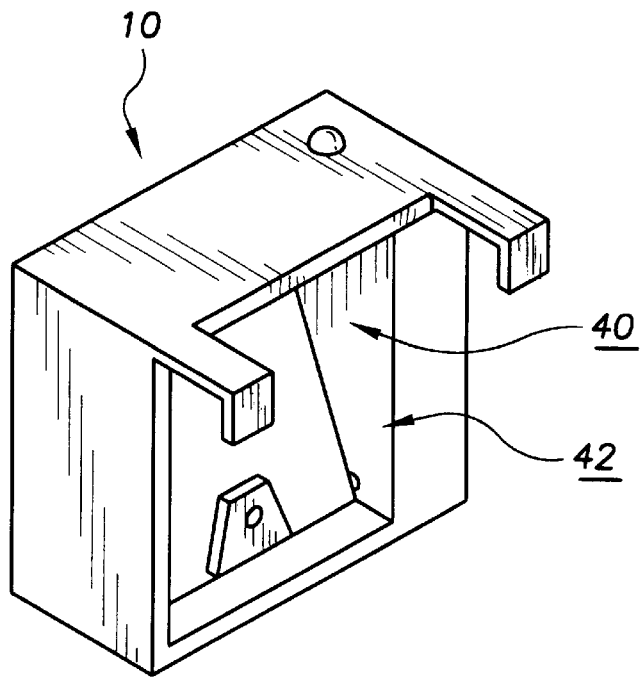
FIG. 2 is a rear perspective view of the exemplary air filter monitoring device of FIG. 1 showing the air flow chamber and the second air flow actuated switch.
Figure 3:
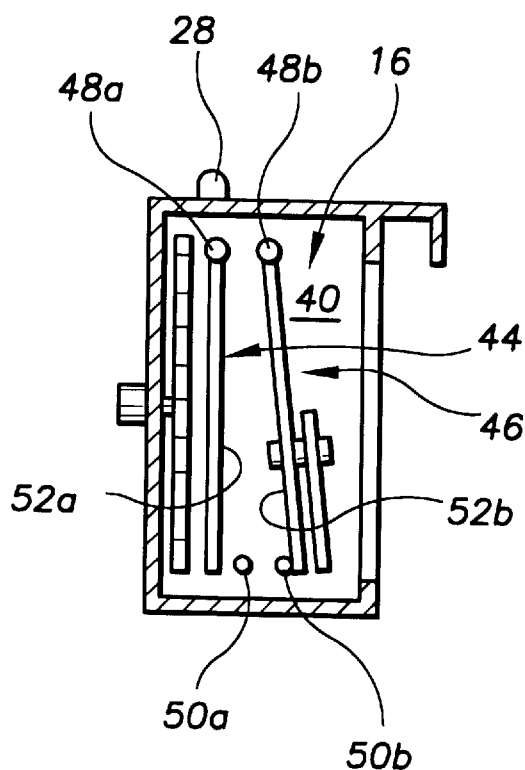
FIG. 3 is a cross sectional view of the monitoring device along the line I—I of FIG. 1 showing the first and second air flow actuated switches including the first and second top pivoting rods, and the first and second contact rods, and the first and second air resistance plates.

Referring to FIG. 2, air flow chamber 40 has a substantially square cross sectional area and is provided with a full size air discharge opening 42. With reference now to FIG. 3, monitoring circuit 16 (FIGS. 5–7) includes a first and a second air flow activated monitoring switch 44,46 and LED 28. First and second air flow actuated monitoring switches 44,46 are pendulum type air flow switches that are set to pivot at different air flow rates. Each Monitoring switch 44,46 includes an electrically conductive top pivot rod 48a,48b; an electrically conductive bottom contact rod 50a,50b, and an electrically conductive air resistance plate 52a,52b. First air flow actuated switch is set to pivot in response to a first predetermined air flow value that is selected by selecting the length, area and weight of first air resistance plate 52a. Second air flow actuated switch is set to pivot in response to a second predetermined air flow value that is selected by selecting the length, area and weight of second air resistance plate 52a and through a user set plate airflow adjustment mechanism 60 discussed herein further below. The second predetermined air flow value is selected to be greater than the first predetermined air flow value. In this embodiment, bottom contact rods 50a,50b are electrically connected. Each air resistance plate 52a,52b pivotally depends from its respective top pivot rod 48a,48b and is pivotal in response to air flow through air flow chamber 40.

Figure 4:
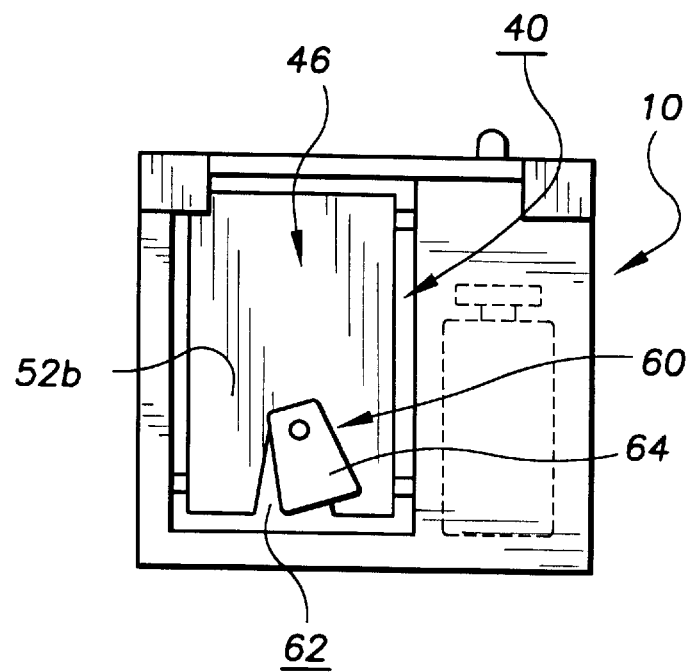
FIG. 4 is a rear plan view of the air filter monitoring device of FIG. 1 showing the air resistance plate of the second air flow actuated switch positioned across and partially blocking the air flow chamber, the top pivot rod, the bottom contact rod, and the adjustment mechanism for adjusting the air flow value at which the second air flow actuated switch is actuated.

With reference to FIG. 4, each air resistance plate 52a,52b is sized to block a sufficient portion of air flow chamber 40 to cause air flowing through air flow chamber 40 to pivot air resistance plates 52a,52b, respectively, when the air flow values reach the first and second predetermined values. As mentioned herein above, in this embodiment, air resistance plate 52b is provided with a plate airflow adjustment mechanism 60 that includes an air flow notch 62 and a pivoting cover plate 64. By positioning pivoting cover plate 64 to cover different areas of air flow notch 62 the second predetermined value at which second air flow actuated switch 46 is actuated can be adjusted by the user to operate with a particular air conditioning system.

FIGS. 5–7 schematically illustrate operation of monitoring circuit 16. Referring specifically to FIG. 5, when the blower of the air conditioning system is not in operation and no air flow exists through air flow chamber 40, first air resistance plate 52a is pulled down by gravity out of contact with contact rod 50a and second air resistance plate 52b is force by gravity into contact with contact rod 50b creating an open circuit between a battery 66 and LED 28. Referring now to FIG. 6, when the blower of the air conditioning system is operating and the filter is unclogged, the air flow through air flow chamber 40 exceeds the second predetermined value causing first air resistance plate 52a to be pivoted into contact with contact rod 50a and second air resistance plate 52b to be pivoted out of contact with contact rod 50b again creating an open circuit between battery 66 and LED 28. With reference to FIG. 7, when the blower of the air conditioning system is operating and the filter is clogged, the air flow through air flow chamber 40 exceeds the first predetermined value but is less than the greater second predetermined value causing first air resistance plate 52a to be pivoted into contact with contact rod 50a while second air resistance plate 52b remains in contact with contact rod 50b creating a closed circuit between battery 66 and LED 28 causing LED 28 to become illuminated visually signaling a clogged filter condition.

It can be seen from the preceding description that an air filter monitoring device has been provided that is attachable to the air return intake of an air conditioning system that can detect a clogged filter condition and provide an alerting output; that includes a pair air flow actuated switches that are wired in series with an alerting device; that includes a pair of air flow actuated switches wherein each of the air flow actuated switches is actuated at a different air flow value; that includes a user adjustable air intake opening to allow the user to tune the monitoring device to a particular air conditioning system; and that includes a pair of air flow actuated switches wherein at least one of the air flow actuated switches includes an adjustment mechanism for adjusting the air flow value at which it is actuated.

It is noted that the embodiment of the air filter monitoring device described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A air filter monitoring device comprising:

a housing having an air flow chamber formed therein, an air outlet in connection with said airflow chamber and an adjustable air intake inlet in connection with said air flow chamber;

an attachment mechanism in connection with said housing for attaching said housing to a cover grate of an air return of an air conditioning system;

an electrically energized alerting device;

a first and a second air flow actuated switch, said first and second airflow actuated switches being wired electrically in series with said alerting device, each of said first and said second air actuated switches having an air resistance plate positioned within said air flow chamber, said first air flow actuated switch being normally open and actuated into a closed position by an airflow through said air flow chamber that is greater than a first predetermined value, said second air flow actuated switch being normally closed and actuated into an opened position by an air flow through said air flow chamber that is greater than a second predetermined value, said first and second predetermined values being selected such that when no air is flowing through said air flow chamber said first and second air actuated switches provide an open circuit between said alerting device and an electrical power source, when air is flowing through said air flow chamber at a value greater than said first predetermined value and less than said second predetermined value, said first and second air actuated switches provide a closed circuit between said alerting device and an electrical power source to activate said alerting device, and when air is flowing through said air flow chamber at a value greater than said first predetermined value and greater than said second predetermined value, said first and second air actuated switches provide an open circuit between said alerting device and an electrical power source.

2. The air filter monitoring device of claim 1 wherein:
said second airflow actuated switch includes a plate airflow adjustment mechanism.

3. The air filter monitoring device of claim 2 wherein:
said plate airflow adjustment mechanism includes an air flow notch and a pivoting cover plate that is positionable to cover different areas of air flow notch.

4. The air filter monitoring device of claim 1, wherein:
said first air flow actuated switch includes a first electrically conductive top pivot rod; a first electrically conductive bottom contact rod, and a first electrically conductive air resistance plate.

5. The air filter monitoring device of claim 1, wherein:
said second air flow actuated switch includes a second electrically conductive top pivot rod; a second electrically conductive bottom contact rod, and a second electrically conductive air resistance plate.

6. The air filter monitoring device of claim 2, wherein:
said first air flow actuated switch includes a first electrically conductive top pivot rod; a first electrically conductive bottom contact rod, and a first electrically conductive air resistance plate.

7. The air filter monitoring device of claim 2, wherein:
said second air flow actuated switch includes a second electrically conductive top pivot rod; a second electrically conductive bottom contact rod, and a second electrically conductive air resistance plate.

8. The air filter monitoring device of claim 6, wherein:
said second air flow actuated switch includes a second electrically conductive top pivot rod; a second electrically conductive bottom contact rod, and a second electrically conductive air resistance plate.

9. The air filter monitoring device of claim 3, wherein:
said first air flow actuated switch includes a first electrically conductive top pivot rod; a first electrically conductive bottom contact rod, and a first electrically conductive air resistance plate.

10. The air filter monitoring device of claim 3, wherein:
said second air flow actuated switch includes a second electrically conductive top pivot rod; a second electrically conductive bottom contact rod, and a second electrically conductive air resistance plate.

11. The air filter monitoring device of claim 9, wherein:
said second air flow actuated switch includes a second electrically conductive top pivot rod; a second electrically conductive bottom contact rod, and a second electrically conductive air resistance plate.

12. The air filter monitoring device of claim 4, wherein:
said second air flow actuated switch includes a second electrically conductive top pivot rod; a second electrically conductive bottom contact rod, and a second electrically conductive air resistance plate.

13. The air filter monitoring device of claim 12, wherein:
said first and said second bottom contact rods are in direct electrical connection.

14. The air filter monitoring device of claim 13 wherein:
said second airflow actuated switch includes a plate airflow adjustment mechanism.

15. The air filter monitoring device of claim 14 wherein:
said plate airflow adjustment mechanism includes an air flow notch and a pivoting cover plate that is positionable to cover different areas of air flow notch.

* * * * *